United States Patent [19]

Selbertinger et al.

[11] Patent Number: 5,758,761
[45] Date of Patent: Jun. 2, 1998

[54] INSTALLATION AND A PROCESS FOR LUBRICATING, CLEANING AND/OR DISINFECTING CONVEYOR BELTS OR CHAINS

[75] Inventors: Josef Selbertinger, Staudach; Harry Weinert, Chemnitz, both of Germany

[73] Assignee: Lang Apparatebau GmbH, Siegsdorf, Germany

[21] Appl. No.: 619,492
[22] PCT Filed: Sep. 14, 1994
[86] PCT No.: PCT/EP94/03076
§ 371 Date: Apr. 17, 1996
§ 102(e) Date: Apr. 17, 1996
[87] PCT Pub. No.: WO95/08497
PCT Pub. Date: Mar. 30, 1995

[30] Foreign Application Priority Data

Sep. 23, 1993 [DE] Germany ............ 43 32 375.8

[51] Int. Cl.[6] .................................................. B65G 47/22
[52] U.S. Cl. ................................. 198/495; 198/500
[58] Field of Search ................................ 198/493, 495, 198/500

[56] References Cited

U.S. PATENT DOCUMENTS

| 4,226,325 | 10/1980 | Vandas | 198/493 |
| 4,262,776 | 4/1981 | Wilson et al. | 198/500 X |
| 4,627,457 | 12/1986 | Bird et al. | 198/500 X |
| 5,320,132 | 6/1994 | Weisse | 198/500 X |

FOREIGN PATENT DOCUMENTS 0079152  5/1983  European Pat. Off. .

Primary Examiner—James R. Bidwell
Attorney, Agent, or Firm—Ernest G. Szoke; Wayne C. Jaeschke; Frank E. Robbins

[57] ABSTRACT

A process and apparatus for applying a solution to a conveyor system, for lubricating the system, or for cleaning and disinfecting the conveyors in the system and objects carried by the conveyor system, comprising mixing a dilutable concentrate of a cleaner, disinfectant, or mixture thereof, or a lubricant, from a source of supply that is remote from said conveyor system, with a quantity of fresh water, and, controlling the flow rate to the mixing step of said concentrate in response to the flow rate of said fresh water, to achieve a solution of the concentrate at a desired concentration for use.

14 Claims, 2 Drawing Sheets

INSTALLATION AND A PROCESS FOR LUBRICATING, CLEANING AND/OR DISINFECTING CONVEYOR BELTS OR CHAINS

BACKGROUND OF THE INVENTION

Field of the Invention

This invention relates to an installation for lubricating and, optionally, cleaning or disinfecting conveyors, more particularly belt or chain conveyors, for food containers, such as bottles, cans, glasses, bags and the like, and for their packs, such as bottle boxes and the like. In one embodiment, the installation comprises a central metering station comprising at least one metering pump for removing the lubricant concentrate from the supply container and for the measured introduction thereof into a metering pipe leading to the conveyor system. In addition, at least one distributing pipe connected to the metering pipe by a lubrication circuit valve is provided, leading to the nozzles through which the lubricant can be applied to the conveyor belts or chains. Finally, the installation comprises at least one fresh water connection with a pressure reducing valve for equalizing variations in the water pressure and a mixing unit for preparing a lubricating solution to be formed from the lubricant concentrate and the fresh water.

In the filling of new or reused glass or plastic bottles, cans, bags and the like with beverages or other foods, the containers are transported to the individual stations on conveyors, for example belt or chain conveyors. The conveyors generally consist of single-belt or multiple-belt chains of metal or plastic which are driven at a speed adapted to the production rate. They are divided up into individual sections with their own respective drives according to the space available and the production rate. The conveyor belts are sprayed with special chain lubricants, so-called belt lubricants, to reduce friction at places particularly vulnerable to wear. The places in question are, in particular, friction surfaces between the chain and the support, for example the slide rails, friction surfaces between the chain and the containers being conveyed, the hinges of the chains, the chain guide rollers and the friction surfaces between touching containers. Individual sections of the conveyor belt are arranged to form so-called "lubrication circuits" according to the production rate and the requirements which the lubrication of the chains and their guides are expected to satisfy. The main requirements which the lubricating installation are expected to meet require the preparation of a lubricant solution—consisting of water and a water-soluble chemical—with a constant concentration and in the application of this solution to the conveyor belts in accordance with the requirements which the individual lubrication circuits are expected to meet. So far as the form of application is concerned, the lubricating solution may be applied by a time-dependent system, in which the lubricating solution is only applied when the conveyor belt is in operation, or by a volume-dependent system in which a certain amount of lubricating solution per lubrication circuit is applied through magnetic valves with pulse/interval timing or through magnetic valves timed as a function of conveyor speed. The concentration of the lubricating solution may be adjusted to different values according to the requirements for each lubrication circuit. Different concentrations may be used, for example, for conveyor belts for bottle boxes, for empty dry bottles, for empty wet bottles, for full wet bottles and for merging conveyor belts. In this case, for example, five or more different concentrations may be used.

In modern belt lubrication installations and processes, the lubricating solution is centrally prepared in the immediate vicinity of the chemicals storeroom, for example in a cellar or other side room. The lubricant concentrate is added to the fresh water by a proportional metering system. One or more metering pumps are actuated by pulse water meters so that, for a fixed throughflow of water, a constant quantity of the chemical is added. The centrally prepared lubricating solution is transported through branch pipes to a central point of the conveyor belt system. The pipes have cross-sections of up to DN 40 (inside diameter of 40 mm), depending on the throughflow, and are made of stainless steel or plastic.

The separation into the individual lubrication circuits by means of magnetic valves and pressure reducers takes place in the vicinity of the conveyor belt system. From the magnetic valves, distributing pipes lead along the conveyors. Exits are provided for each conveyor section. They are generally provided with manual shutoffs and lead to the spray nozzles for applying the lubricating solution to the particular conveyor section. The magnetic valves are actuated via electromechanical timer control systems or freely programmable control systems.

If several concentrations of the lubricating solution are required, several metering systems are installed in the central station mentioned above and solutions (in-use solutions) with different concentrations are prepared and delivered to the conveyor system through several branch pipes. Accordingly, the number of branch pipes corresponds to the number of different concentrations required.

SUMMARY OF THE INVENTION

The problem addressed by the present invention was to reduce the expense involved in building a central lubricating installation of the type mentioned at the beginning. In particular, inexpensive modification would be possible at minimal cost should another different lubricant concentration be required. In addition, handling by the person in charge of the installation would be considerably simplified so that operational reliability would be increased.

According to the invention, the solution to this problem is characterized in that the fresh water connection and the mixing unit are arranged in the vicinity of the conveyor system spatially separated from the central metering station, in that the mixing unit is preceded by a flow meter for the fresh water supply and in that a control line leads from the output of the flow meter to the metering pump.

Through the spatial separation of metering pumps and mixing units, there is no longer any need for the fresh water required for preparation of the lubricating solution to be taken into the chemicals storeroom. Investment costs for the installation are considerably reduced. The fresh water is only supplied at the central station within the conveyor system. By virtue of the resulting considerable reduction in pipe length, the pressure drop typical of known branch pipe systems no longer occurs and the process as a whole is afforded greater protection through higher system pressure reserves. The full water pressure available can be applied to the distributing pipe system. Smaller distributing pipe cross-sections are possible and result in a reduction in material and assembly costs.

The subsequent addition of another solution concentration line, if desired, entails only minimal expenditure. Process optimization work on existing installations can be carried out very reasonably in terms of cost. The spatial separation of metering pumps and mixing units allows considerably smaller cross-sections for the metering pipes by comparison with the branch pipes of known installations because the metering pipes need only be designed for the lubricant concentrate whereas the branch pipes have to be designed for the in-use solution.

Finally, the better organized and simpler construction of the metering system and the following pipe system simplifies handling by the person in charge of the installation and provides for greater operational reliability.

Where several different concentrations of the lubricating solution are required, several metering pumps with their own metering pipes, fresh water connections and mixing units are provided. For each desired concentration of the lubricating solution, a metering pump of appropriate performance is installed in the chemicals storeroom in the immediate vicinity of the supply chemicals storage vessels, for example drums, containers, canisters and tanks. Each metering pump is connected on its suction side to a storage vessel. In the case of small containers, automatic changeover to a full container whenever a container is signalled empty is advantageous.

In another embodiment of the invention, the mixing unit comprises a mixing chamber for lubricant concentrate and fresh water. This eliminates variations in the concentration of the lubricating solution in the distributing pipe attributable to the metering intervals technically arising in any proportional metering system. In addition, the mixing chamber provides for a particularly homogeneous lubricating solution at a constant concentration.

Another embodiment of the invention is characterized in that a pulse water meter integrated in the mixing unit is associated with the flow meter for fresh water.

In known centralized lubrication systems, a separate filter is provided for each nozzle. In order further to reduce investment costs, another embodiment of the invention is distinguished by the fact that, in contrast to known standard arrangements, each lubrication circuit valve is preceded by a filter. There is thus no need for the filters preceding the nozzles.

Individual volume adjustment of the lubricating solution to be sprayed on is possible if each nozzle or each nozzle block—where there are several nozzles instead of a single nozzle—is preceded by a flow control valve. There is thus no longer any need for the pressure reducers hitherto required for each lubrication circuit. Besides the cost advantage, problems with aerosol formation are avoided.

The integration of a pressure retaining valve in the flow control valves provides for the required spray pattern, even when the nozzles have different static heights. There is no longer any need for the pressure retaining valve hitherto required for each nozzle and material, assembly and servicing costs are reduced.

Constant monitoring of the solvent concentration and documentation of the consumption of lubricant concentrate and water are possible if the metering pipe is equipped with a flow meter and thus enables the consumption of lubricant concentrate together with the consumption of water to be determined and, preferably, recorded.

The present invention also relates in another embodiment to a process for lubricating, cleaning and/or disinfecting conveyor systems, more particularly belt or chain conveyors, for food containers, such as bottles, cans, glasses, bags and the like, and for their packs, such as bottle boxes and the like. In this embodiment lubricant, cleaner or disinfectant concentrate is diluted with fresh water to form an in-use solution and the in-use solution thus formed is applied to the conveyor through nozzles arranged in one or more lubrication circuits.

In this process, the solution to the problem addressed by the invention, as stated above, is characterized in that the concentrate is pumped from a location spatially separated from the conveyor system (normally the chemicals storeroom) through a pipe (metering pipe) to the conveyor system where it is diluted with fresh water and the throughflow rate of the concentrate is controlled and coordinated with the feed rate of the fresh water added.

Other embodiments of the process according to the invention are recited in the dependant claims. The advantage of the embodiments that are recited in the dependent claims are as discussed in the foregoing.

DESCRIPTION OF THE PREFERRED EMBODIMENT

Figure 1:
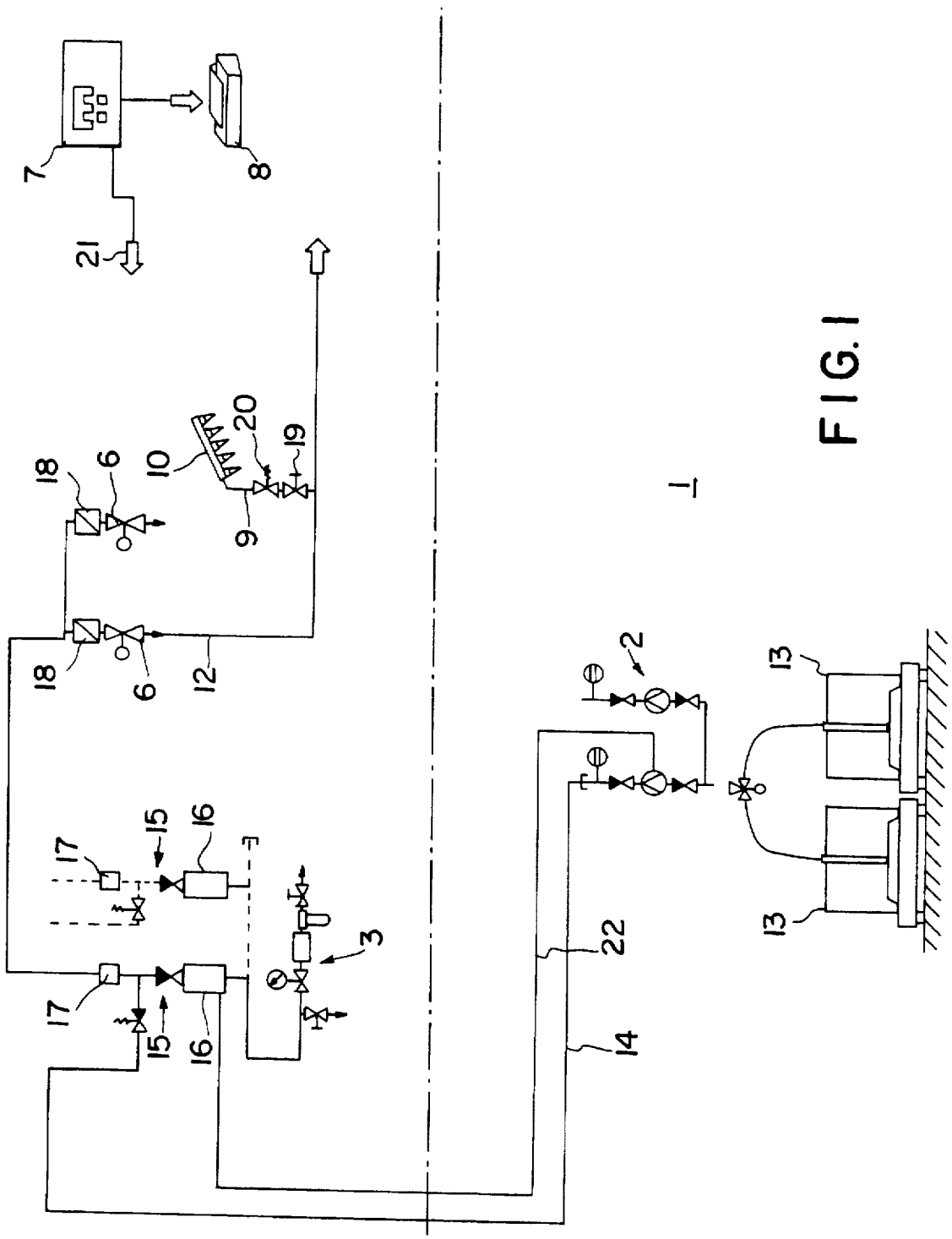
FIG. 1 is a schematic view showing an installation employed to practice the process of the invention.

One embodiment of the invention is described in detail in the following with reference to FIG. 1 of the accompanying drawings. FIG. 2 is a flow chart of already known installations and processes for lubricating conveyor belts.

In the known process illustrated in FIG. 2, the belt lubricating solution is centrally prepared in the chemicals storeroom 1. The lubricant concentrate is taken in by one or more central metering stations 2 and added to the water supplied from the fresh water connection 3. The number of central metering stations provided corresponds to the number of different lubricant concentrations required. The fresh water connection is equipped with a system separator according to DIN 1983 and DVGW (a standard device in Germany to prevent the flow back of the water). The metering pumps are actuated by pulse water meters so that a constant quantity of concentrate is introduced into a fixed amount of inflowing fresh water.

The in-use solution flows to the conveyors 5 through one or more branch pipes 4. Each branch pipe is divided up into the lubrication circuits which, through a lubrication circuit valve 6, provide for a predetermined throughput of lubricant differing according to the particular lubrication circuit or for a throughput which differs according to the process conditions of the production plant. The lubrication circuit valves 6 are actuated by the control unit 7 which is connected to a documentation unit 8. Exits 9 lead from the distributing pipe 12 through shutoff valves 11 to the individual nozzles or nozzle blocks 10.

Figure 2:
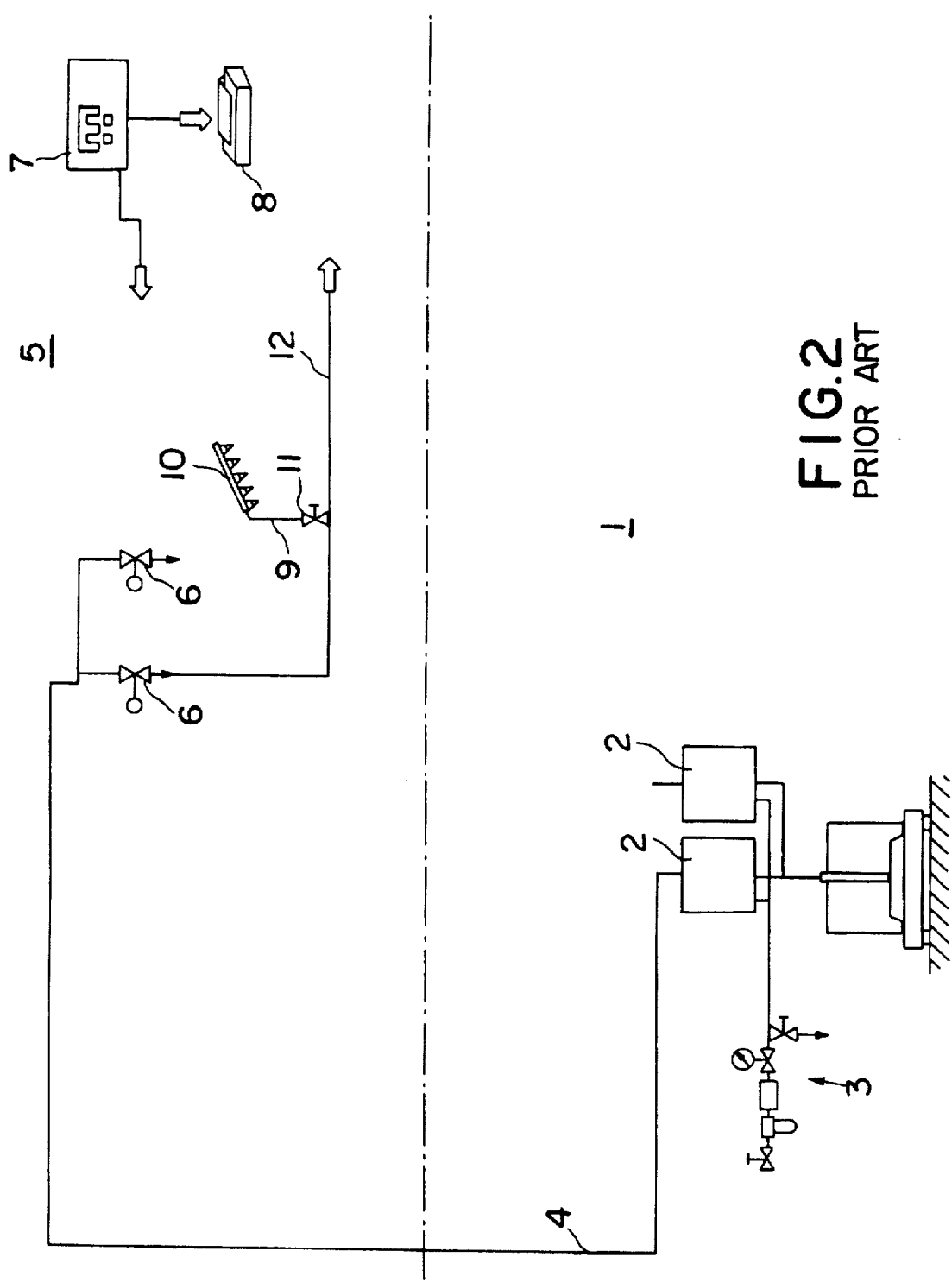
FIG. 2 is a schematic view illustrating an installation employed to practice a prior art process.

One embodiment of the installation according to the invention is schematically illustrated in FIG. 1 from which the corresponding process according to the invention is also clear. In the chemicals storeroom 1, the lubricant concentrate is drawn from the vessels 13 (canisters, drums, containers, tanks) by one or more central metering stations 2, which comprise one or more metering pumps in a modular construction, and pumped through the metering pipe 14 to the conveyors. A separate metering pump of appropriate performance is installed for each concentration of the lubricating solution. In the case of small containers for the concentrate, automatic changeover to a full container whenever a container is signalled empty is possible.

The spatial separation of the chemicals storeroom and the conveyors is symbolized by the thick dash-dot line in FIGS. 1 and 2.

The metering pipes 14 have a cross-section of DN 6 (inside diameter of 6 mm) and are made of plastic or stainless steel. The specific output of the metering pumps is at most 15 l/h. The metering output can be determined by a flow meter installed in the metering pipe 14.

Mixing units 15 are installed in the central station within the conveyor system in a number corresponding to the number of metering pumps and hence to the number of required concentrations of the lubricant solution. Each mixing unit essentially comprises a housing of stainless steel and/or plastic, a fresh water connection 3, a pulse water meter 16, a metering valve, a mixing chamber 17 and connections for fine filters 18 and lubrication circuit valves 6. As in the installation shown in FIG. 2, the fresh water connection 3 is equipped with a system separator according to DIN 1983 and DVGW for separation from the mains water supply. Signals emanating from the pulse water meter 16 pass through the control line 22 into the chemicals storeroom 1 where they actuate the metering pumps.

The distributing pipes 12 are connected to the lubrication circuit valves 6 along the conveyors. The exits 9 to the individual nozzles or nozzle blocks 10 are connected to the distributing pipe 12 through flow control valves 19 with integrated pressure retaining valves 20.

The lubrication circuit valves 6 are actuated by an electromechanical or freely programmable control unit 7 to which a documentation unit 8 is connected. The control signals are symbolized by the arrow 21.

As mentioned above, the most important feature of the invention is the spatial separation of the metering system into metering pumps and mixing units. The filtration of the lubricant solution by each fine filter 18 for each lubrication circuit, and the flow control for each spray nozzle or nozzle block, achieved by the flow control valves 19 and pressure retaining valves 20 are also important.

| List of Reference Numerals | |
| --- | --- |
| 1 | Chemicals storeroom |
| 2 | Central metering station |
| 3 | Fresh water connection |
| 4 | Branch pipe |
| 5 | Conveyors |
| 6 | Lubrication circuit valve |
| 7 | Control unit |
| 8 | Documentation unit |
| 9 | Exit |
| 10 | Nozzle, nozzle block |
| 11 | Shutoff valve |
| 12 | Distributing pipe |
| 13 | Container |
| 14 | Metering pipe |
| 15 | Mixing unit |
| 16 | Pulse water meter |
| 17 | Mixing chamber |
| 18 | Fine filter |
| 19 | Flow control valve |
| 20 | Pressure retaining valve |
| 21 | Arrow (control signals) |
| 22 | Control line |

We claim:

1. A process for applying a solution to a conveyor system, for lubricating the system, or for cleaning and disinfecting the conveyors in the system and objects carried by the conveyor system, comprising mixing a dilutable concentrate of a cleaner, disinfectant, or mixture thereof, or of a lubricant, from a remote source of supply, with a quantity of fresh water, and controlling the rate of flow to the mixing step of said concentrate in response to the flow rate of fresh water, to achieve a solution of the concentrate at a desired concentration for use.

2. The process of claim 1 including the step of filtering said solution prior to applying it, at a location in close proximity to said conveyor system.

3. The process of claim 1 including the step of applying said solution as a spray using at least one spray nozzle, and individually adjusting the flow rate of said solution to each spray nozzle used.

4. The process of claim 1 including the step of continuously monitoring and measuring the flow rate of said concentrate to said mixing step.

5. A process for applying a solution to a conveyor system, for lubricating the system, or for cleaning and disinfecting the conveyors in the system and objects carried by the conveyor system, comprising mixing a dilutable concentrate of a cleaner, disinfectant, or mixture thereof, or a lubricant, from a source of supply that is remote from said conveyor system, with a quantity of fresh water, and, continuously monitoring and measuring the flow rate of said concentrate to said mixing step, continuously monitoring and measuring the flow rate of said fresh water to said mixing step, controlling the flow rate to the mixing step of said concentrate in response to the flow rate of said fresh water, to achieve after said mixing step a solution of the concentrate at a desired concentration for use, and applying said solution as a spray using at least one spray nozzle, and individually adjusting the flow rate of said solution to each spray nozzle used, respectively, and filtering said solution prior to applying it, at a location in close proximity to said conveyor system.

6. Apparatus for cleaning and disinfecting, or for lubricating a conveyor system, and objects carried by said system, comprising metering means for transferring a dilutable concentrate of a cleaner, a disinfectant, or a mixture thereof, or of a lubricant, from a remote source of supply to a location in close proximity to said conveyor system, at a flow rate that is adjustable, mean for supplying a flow of fresh water to said location, means at said location for mixing said concentrate and said fresh water, to form a solution, means for controlling the rate of flow of said concentrate to said mixing source in response to the flow rate of said fresh water, to produce a solution at a desired concentration for use, and means for applying said solution to said conveyor system, to achieve the desired purpose.

7. The apparatus of claim 6, including means at a location in close proximity to said conveyor system for filtering said solution prior to applying it.

8. The apparatus of claim 6 including at least one spray nozzle for applying said solution to said conveyor system, and means for individually adjusting the flow rate of said solution for each said spray nozzle that is used.

9. The apparatus of claim 6 including means for monitoring and measuring the flow rate of said concentrate to said mixing means.

10. The apparatus of claim 6 wherein said means for supplying a flow of fresh water to said location includes a flow meter for controlling the flow of the supply of fresh water, and wherein said means for controlling the rate of flow of said concentrate to said mixing means is responsive to the flow rate of said fresh water, to control the mixing process to achieve a solution at a desired concentration for use.

11. The apparatus of claim 10 wherein said flow meter for said flow of the supply of fresh water comprises a pulse water meter that is connected to said mixing means.

12. The apparatus of claim 6, wherein said means for supplying a flow of fresh water includes a pressure reducing valve for equalizing variations in the water pressure.

13. The apparatus of claim 6 wherein filter means are disposed for filtering said solution prior to its transfer to said means for applying such solution to said conveyor system.

14. The apparatus of claim 6 wherein said metering means for transferring said dilutable concentrate to a location in close proximity to said conveyor system includes a flow meter to measure the flow of said concentrate.

* * * * *